United States Patent
Gentsch et al.

(10) Patent No.: US 11,527,873 B2
(45) Date of Patent: Dec. 13, 2022

(54) INNER COMPARTMENT DESIGN FOR MEDIUM VOLTAGE SWITCHGEARS

(71) Applicant: ABB Schweiz AG, Baden (CH)

(72) Inventors: Dietmar Gentsch, Ratingen (DE); Michael Kessler, Heiligenhaus (DE); Dalibor Kopp, Brno (CZ); Christian Reuber, Willich (DE)

(73) Assignee: ABB Schweiz AG, Baden (CH)

( * ) Notice: Subject to any disclaimer, the term of this patent is extended or adjusted under 35 U.S.C. 154(b) by 226 days.

(21) Appl. No.: 16/903,398

(22) Filed: Jun. 17, 2020

(65) Prior Publication Data
US 2020/0335951 A1  Oct. 22, 2020

Related U.S. Application Data

(63) Continuation of application No. PCT/EP2018/085069, filed on Dec. 14, 2018.

(30) Foreign Application Priority Data

Dec. 19, 2017 (EP) .................................. 17208681

(51) Int. Cl.
*H02B 13/045* (2006.01)
*H02B 13/065* (2006.01)

(52) U.S. Cl.
CPC ......... *H02B 13/065* (2013.01); *H02B 13/045* (2013.01)

(58) Field of Classification Search
CPC .. H02B 13/065; H02B 13/045; H02B 13/025; H02B 13/0352; H02B 13/0358; H02B 1/20; H01H 9/30

USPC ........... 312/223.1, 291, 292, 293.1; 218/151
See application file for complete search history.

(56) References Cited

U.S. PATENT DOCUMENTS

| | | | | |
|---|---|---|---|---|
| 7,236,353 B2* | 6/2007 | Davidson | ............... | G06F 1/183 361/801 |
| 8,101,881 B2* | 1/2012 | Miller | .................. | H02B 13/025 361/608 |
| 8,680,421 B2* | 3/2014 | Hyrenbach | .......... | H02B 13/055 218/118 |
| 8,916,059 B2* | 12/2014 | Glasmacher | ......... | H02B 13/055 252/68 |
| 9,431,799 B2* | 8/2016 | Jung | ...................... | H02G 5/063 |
| 2005/0103514 A1 | 5/2005 | Utsumi et al. | | |
| 2005/0224465 A1 | 10/2005 | Lammers | | |
| 2006/0152890 A1* | 7/2006 | Yokokura | .............. | H01H 33/24 361/605 |
| 2013/0050905 A1* | 2/2013 | Kim | ..................... | H02B 13/045 361/608 |

(Continued)

FOREIGN PATENT DOCUMENTS

| | | |
|---|---|---|
| CH | 376555 A | 4/1964 |
| CN | 1619745 A | 5/2005 |

(Continued)

*Primary Examiner* — William A Bolton
(74) *Attorney, Agent, or Firm* — Leydig, Voit & Mayer, Ltd.

(57) ABSTRACT

An inner compartment for medium voltage gas insulated switchgears includes: at least one inner compartment; and a housing. The inner compartment, or in case of several inner compartments, an inner of the inner compartment, or one of the inner compartments, is provided on an inner wall surface thereof at least partially with an insulating layer.

9 Claims, 1 Drawing Sheet

(56) References Cited

U.S. PATENT DOCUMENTS

2013/0327779 A1* 12/2013 Baudach .................. F17C 1/08
220/654

FOREIGN PATENT DOCUMENTS

| CN | 1643753 A | 7/2005 |
|---|---|---|
| CN | 104362536 A | 2/2015 |
| DE | 7232011 U | 11/1972 |
| DE | 2418796 A1 | 10/1975 |
| DE | 2710843 A1 | 9/1978 |
| WO | WO 03081738 A1 | 10/2003 |

* cited by examiner

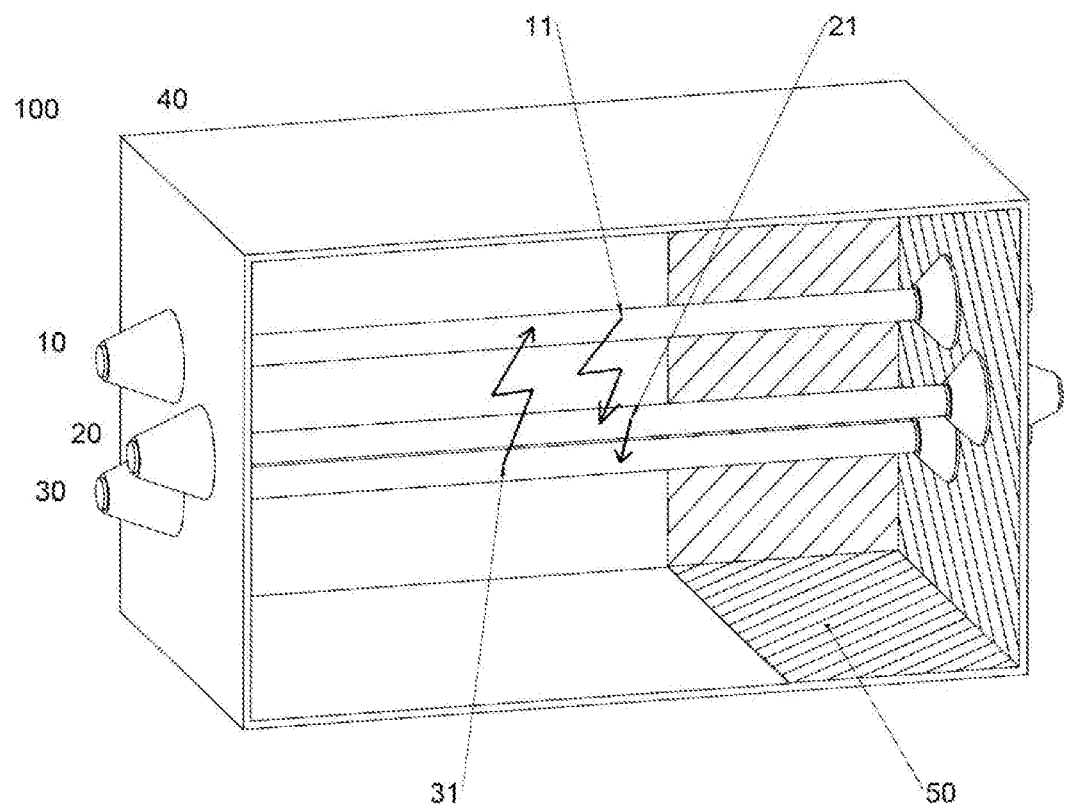

INNER COMPARTMENT DESIGN FOR MEDIUM VOLTAGE SWITCHGEARS

CROSS-REFERENCE TO PRIOR APPLICATION

This application is a continuation of International Patent Application No. PCT/EP2018/085069, filed on Dec. 14, 2018, which claims priority to European Patent Application No. EP 17 208 681.1, filed on Dec. 19, 2017. The entire disclosure of both applications is hereby incorporated by reference herein.

FIELD

The invention relates to the inner compartment design for medium voltage switchgears.

BACKGROUND

In gas insulated switchgear, so called gas insulated compartments GIS, electrical arcs can occur between the conductors and the grounded wall. Due to its energy, the arc can weld a hole through the wall, or even destroy it. The design of the switchgear has to ensure that the wall withstands the arc for a certain time, as defined in the relevant standards.

State of the art is, to install additional pieces of grounded pieces of conductive material, e.g. steel bars, that are not part of the wall of the compartment, and that are supposed to offer a footpoint to the arc instead of the wall, so that the arc would damage said additional bars and not the wall.

The state of the art solution has the following disadvantages:

Additional bars are needed, only usual steel without any prevention in material use and withstand, and additional weight and costs to the switchgear itself.

The additional bars furthermore generate additional losses inside the compartment due to eddy currents. These losses could be reduced, when the additional bars are being made of non-ferromagnetic steel, but this material adds further costs to the switchgear.

SUMMARY

In an embodiment, the present invention provides an inner compartment for medium voltage gas insulated switchgears, comprising: at least one inner compartment; and a housing, wherein the inner compartment, or in case of several inner compartments, an inner of the inner compartment, or one of the inner compartments, is provided on an inner wall surface thereof at least partially with an insulating layer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows a simple gas insulated switchgear compartment.

DETAILED DESCRIPTION

In an embodiment, the present invention enhances the withstand of the inner compartment against destructive light arc impact, considering at the same time high economic effectivity.

In an embodiment, the present invention is, that at the inner compartment, or in case of several inner compartments, at the inner of the inner compartment or enclosure, or at one of the inner compartments, are provided on its inner wall surface, at least partially with an insulating layer.

This basically prevents a direct impact to the wall, in case of an occurred light arc.

In an advantageous embodiment, the insulating layer is made of a ceramic material, or a ceramic compound material. This has strong withstand against light arc impact because of high resistance up to high temperature.

In an advantageous alternative embodiment, the insulating layer is made of a plastic material, or a plastic compound material. This material has high dielectric withstand an isolation against conductive counterpotential for the light arc.

In a further advantageous embodiment, the insulating layer is a multilayered system with a multilayer of different ceramic and/or plastic material, or structure. Multilayers has high physical effectivity in the aforesaid sense.

In a further advantageous embodiment the insulating layer is made of $Al_2O_3$ or $Y_2O_3$ ceramic.

In a further advantageous embodiment, the aforesaid insulated inner surface of the wall is further covered on its inner surface with an electrically conductive layer. By that, field compensation can be actively operated, in order to prevent a light arc impact as such.

In consequence of that, the aforesaid conductive layer can electrically be connected to capacitive field steering means.

So the invention proposes to use an internal electrical insulation of certain areas of the compartment to avoid that the arc finds a footpoint in said area.

If an electric arc will occur inside a three phase switchgear compartment, it will run between the three phases.

As the burning voltage of the arc is low, compared to the voltage of the network, the arc will practically represent a short-circuit and create a star point of the three phase system. The potential of an ideal star point is not different from the potential of the grounded wall of the compartment.

The potential of the real star point can differ by some hundreds of volts due to unbalances in the three phase systems. Driven by this relatively small voltage, the arc can also run from the three phases to the compartment wall.

As the driving voltage is only a few hundreds of volts, it is possible to avoid the jumping of the arc from the three phases to the compartment wall by an electrical insulation of this wall.

FIG. 1 shows a simple gas insulated switchgear compartment 100 with an enclosure 40 and three conductors 10, 20 and 30. An electrical arc 11, 21, 31 is short-circuiting the three phases. The electrical insulation 50 avoids the jumping of the arc form the phases to the compartment wall in the area covered by the insulating layer 50.

The advantage is, that relatively simple means of electrical insulation avoids the risk, that the arc could burn a hole into the compartment wall or even destroy it.

The significant areas where the insulation is most effective, can be chosen depending on the actual design of the switchgear and the direction of feeding.

An electrical insulation is usually also a thermal insulation; this can increase the temperature of the compartment. The design of the switchgear has to consider this.

The insulating layer can increase the temperature of the compartment, caused by eddy current losses in the metallic shields.

So the further design ca t consider this by usual cooling means.

Said insulating layers can be created by several ways like painting or using plasma spraying of insulating materials like $Al_2O_3$ or $Y_2O_3$.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A gas insulated switchgear compartment, comprising:
   an enclosure; and
   three conductors of three phases,
   wherein the enclosure comprises a plurality of walls,
   wherein the three conductors are at least partially housed within the enclosure,
   wherein at least part of an inner surface of two or more walls of the plurality of walls comprises an electrical insulator layer, and
   wherein an inner surface of the electrical insulation layer has an electrically conductive layer configured to be connected to a capacitor such that field compensation is actively operable.

2. The gas insulated switchgear compartment of claim 1, wherein the electrical insulator layer is configured so as to prevent an electrical arc between the three conductors and the enclosure wall in a region of the at least part of the inner surface of the two or more walls of the plurality of walls comprising the electrical insulator layer.

3. The gas insulated switchgear compartment of claim 2, wherein the electrical insulator layer is configured so as to prevent the electrical arc for a driving voltage of a few hundred volts.

4. The gas insulated switchgear compartment of claim 2, wherein the enclosure and locations of the three conductors and the region of the at least part of the inner surface of the two or more walls of the plurality of walls comprising the electrical insulator layer are configured so as to prevent the electrical arc between the three conductors and the enclosure wall.

5. The gas insulated switchgear compartment of claim 1, further comprising:
   cooling means configured to offset a temperature rise caused by the electrical insulator on the at least part of the inner surface of two or more walls of the plurality of walls.

6. The gas insulated switchgear compartment of claim 1, wherein the electrical insulator layer comprises a ceramic material or a ceramic compound material.

7. The gas insulated switchgear compartment of claim 6, wherein the electrical insulator layer comprises $Al_2O_3$ or $Y_2O_3$ ceramic.

8. The gas insulated switchgear compartment of claim 6, wherein the electrical insulator layer comprises a multilayered system with a multilayer of different ceramic and/or plastic material, or structure.

9. The gas insulated switchgear compartment of claim 1, wherein the electrical insulator layer comprises a plastic material or a plastic compound material.

* * * * *